Patented Aug. 9, 1932

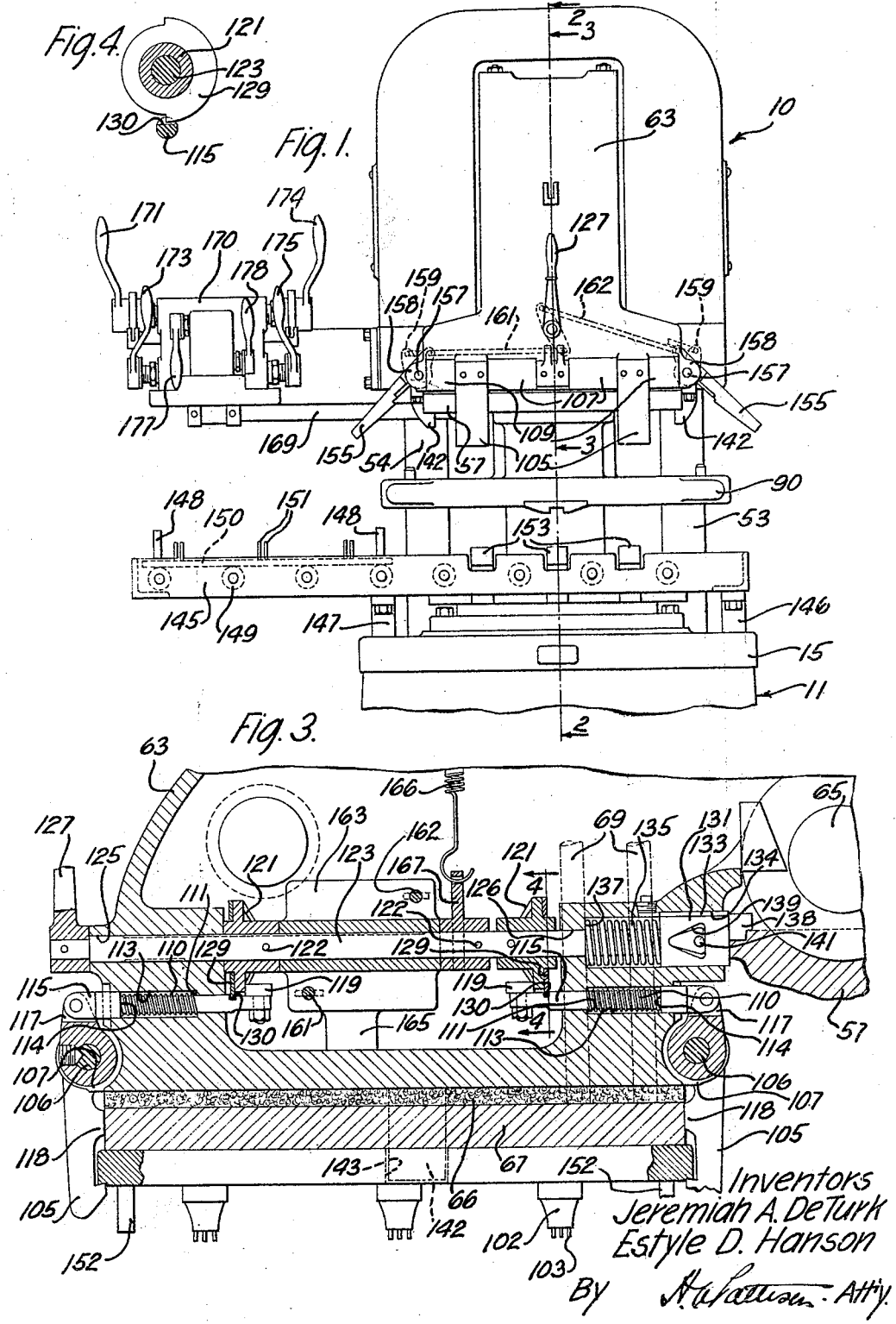

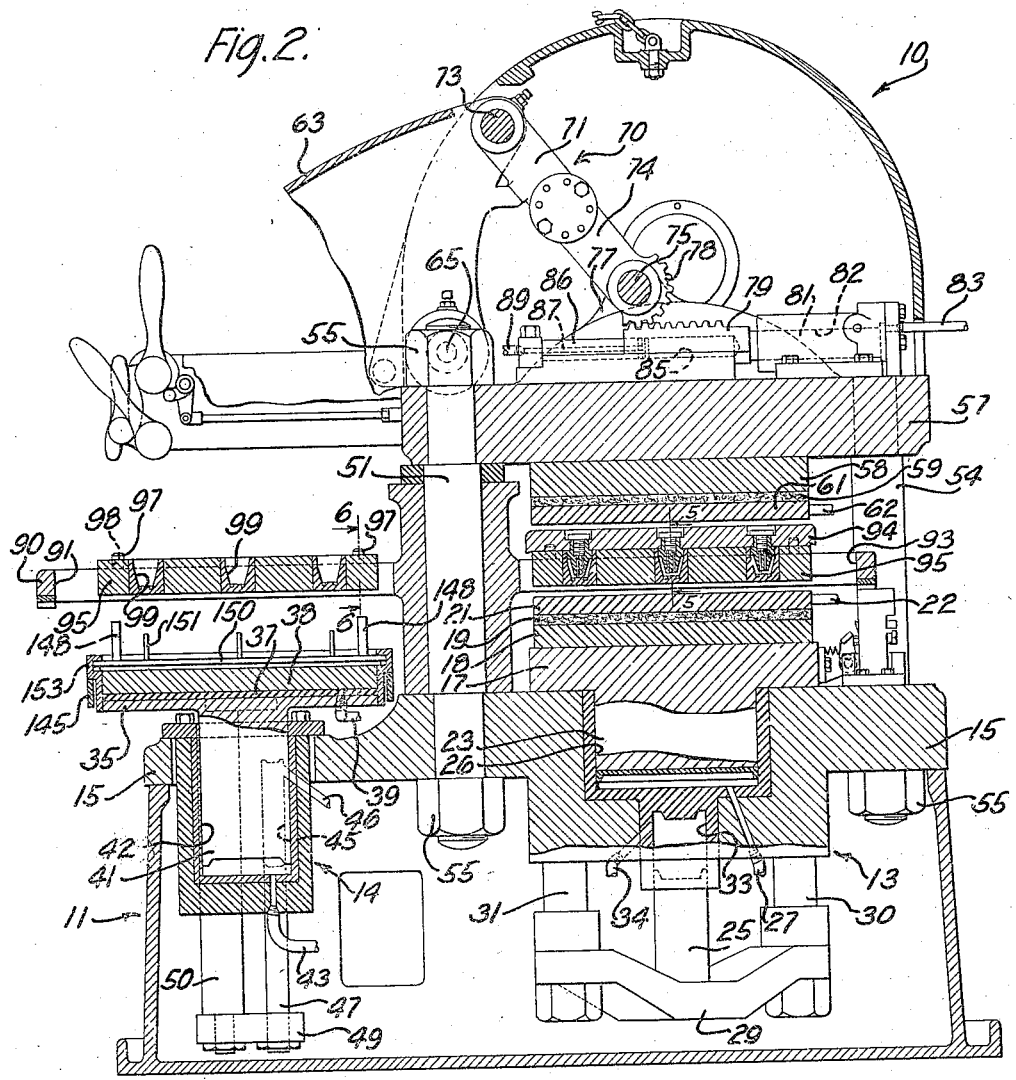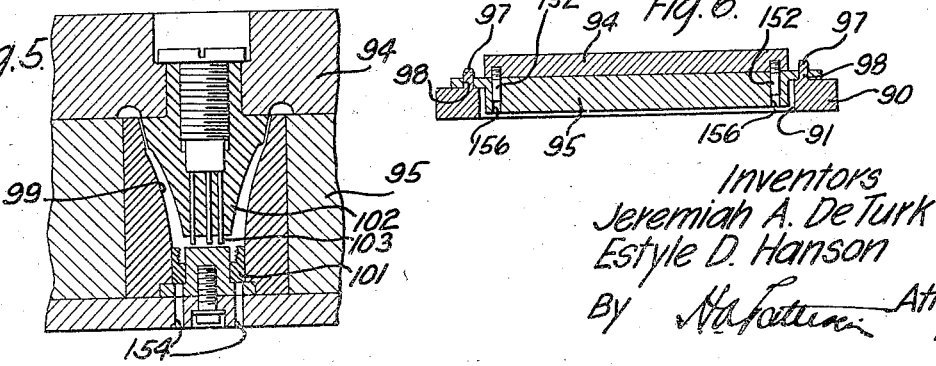

1,871,406

UNITED STATES PATENT OFFICE

JEREMIAH AMOS DE TURK, OF LA GRANGE, AND ESTYLE DRUCY HANSON, OF WEST-MONT, ILLINOIS, ASSIGNORS TO WESTERN ELECTRIC COMPANY, INCORPORATED, OF NEW YORK, N. Y., A CORPORATION OF NEW YORK

MOLDING APPARATUS

Application filed December 10, 1928. Serial No. 324,863.

This invention relates to molding apparatus and more particularly to a hydraulically operated molding press for forming articles from plastic material.

An object of the invention is the provision of mechanism for simplifying and expediting the separation of the mold sections and the ejection of the molded articles.

In accordance with one embodiment of the invention a molding press such as that shown in copending application Serial No. 324,812, filed December 10, 1928, is provided with latches mounted on the tiltable head by means of which the upper mold section may be secured to the tiltable head and an ejector plate for simultaneously ejecting the molded articles from the mold cavities for engagement by the latches.

A manually controlled releasing lever is provided for actuating the latches which automatically grasp the upper half of the mold and may be operated only when the tiltable head is in parallelism with the vertically movable head at the sub-pressing station.

Other objects and advantages of this invention will become apparent from the following detailed description, reference being had to the accompanying drawings, wherein Fig. 1 is a fragmentary front elevational view of a two-station hydraulically operated molding press embodying the features of the invention;

Fig. 2 is a fragmentary sectional view taken on the line 2—2 of Fig. 1, in the direction indicated by the arrows;

Fig. 3 is a fragmentary sectional view of the tilting head taken on the line 3—3 of Fig. 1, in the direction indicated by the arrows;

Fig. 4 is a fragmentary sectional view taken on the line 4—4 of Fig. 3, in the direction indicated by the arrows;

Fig. 5 is a fragmentary sectional view taken on the line 5—5 of Fig. 2, in the direction indicated by the arrows, and Fig. 6 is a fragmentary sectional view taken on the line 6—6 of Fig. 2, in the direction indicated by the arrows, showing the mold sections on the table.

Referring now to the drawings wherein like reference characters designate the same parts throughout the various views, the numeral 10 designates generally a two station hydraulic molding press which includes a base 11 which houses the main press operating mechanism and the sub-press operating mechanism designated generally by the numerals 13 and 14, respectively. The main hydraulic cylinder is suspended from a supporting plate 15 which is cast in one piece of various thicknesses, being thickest adjacent the main press operating mechanism where it will be subjected to the greatest strain. The supporting plate is mounted on the base 11 and the main press operating mechanism supported thereby actuates a head 17 on which are mounted an intermediate plate 18, a heat insulating pad 19 and a steam heated platen 21 to which steam is supplied by a flexible hose 22 connected to a source of supply not shown.

Vertical movement of the head 17 is controlled by two oppositely disposed pistons 23 and 25, the piston 23 moves the head 17 and the parts supported thereby upwardly upon the admission of water to a cylinder 26 with which the piston 23 cooperates. The water is admitted to the cylinder 26 through an inlet and outlet pipe 27 connected under pressure to a source of supply not shown. The piston 25 which is connected to the head 17 by an equalizing cross member 29 having guide posts 30 and 31 attached to either end thereof and to the head 17, causes the movement of the head downwardly upon the admission of water or other fluid under pressure to a cylinder 33 with which the piston 25 cooperates. The water is admitted to the cylinder 33 through an inlet and outlet pipe 34 connected to a source of supply under a pressure substantially less than that of the supply which is admitted to the cylinder 26 and will move the piston 25 downwardly only after the water in the cylinder 26 has been permitted to escape through the inlet and outlet pipe 27.

The sub-press operating mechanism 14, which is of a construction somewhat similar to that of the main press operating mechanism 13, is also supported by the supporting plate 15, and actuates a head 35 upon which are mounted a heat insulating pad 37 and a cooling platen 38 to which water or other fluid cooling medium is admitted through a flexible hose connection 39. Upward movement of the head 35 is caused by a piston 41 on which the head is mounted, cooperating with a cylinder 42, upon the admission of water under pressure thereto through an inlet and outlet pipe 43. The downward movement of the head 35 may be caused by the admission of water under pressure to cylinders 45—45 through pipes 46—46 which will drive a pair of pistons 47—47 cooperating with the cylinders 45—45 downwardly, provided the water in the cylinder 42 is exhausted therefrom through the inlet and outlet pipe 43, the ends of the pistons 47—47 being fixed to an equalizing plate 49 which is secured to the head 35 by guide posts 50—50.

Three upright members 51, 53 and 54 are secured to the supporting plate 15 by means of nuts 55—55 and support a head 57 to which they are also secured by means of nuts 55—55. Fixed to the lower surface of the head 57 is a stationary press head 58 on which are mounted a heat insulating pad 59 and a steam heated platen 61 to which steam is admitted through a pipe 62 and which is in vertical alignment with the steam heated platen 21 mounted on the vertically movable press head 17.

A tiltable head 63 is pivoted to the head 57 at 65 and has secured on its under surface a heat insulating pad 66 (Fig. 3) and a cooling platen 67 to which a cooling fluid is admitted by pipes 69—69 and may be tilted about the pivot point 65 by means of a toggle connection designated generally by the numeral 70. The toggle connection is composed of an upper toggle lever 71 which is pivoted about a pin 73 secured to the head 63, and a lower toggle lever 74 which is pivoted about a pin 75 mounted in supporting members 77—77 secured to the upper surface of the head 57. The lower toggle lever has a segmental gear 78 formed integral with the lower end thereof, the teeth of which mesh with a reciprocable rack 79 which may be moved to the right or the left (Fig. 2) by means of a piston 81 cooperating with a cylinder 82 to which fluid under pressure may be admitted to and exhausted from through a pipe 83.

The rack 79 has a cylindrical chamber 85 formed therein with which a piston 86 having a chamber 87 therethrough cooperates. The cylinder 82 controls the movement of the rack to the left whereas the piston 86 cooperating with the chamber 85 controls the movement of the rack to the right upon the escape of the fluid from the cylinder 82 through pipe 83, the chamber 87 being connected through a pipe 89 to a source of fluid under a pressure less than that furnished to the pipe 83.

A table 90 having apertures 91 and 93 formed therein is rotatable about the upright member 51 and may carry upper and lower molding members 94 and 95 positioned thereon by pins 97—97 which project from the upper surface of the table 90 and engage apertures 98—98 formed in the lower molding member. The molding members, which in this specific example are designed for forming telephone mouthpieces, have cooperating parts between which the mouthpieces may be formed. The lower molding member has a plurality of irregular shaped recesses 99—99 formed therein in which forming members 101—101 are positioned. The upper molding member carries projecting members 102—102 from which extend a plurality of pins 103—103 about which the material placed in the recesses 99—99 in the lower molding member will be molded.

The upper molding member may be secured to the cooling platen 67 of the tiltable head by latches 105—105 fixed to shafts 106—106 journalled in bearings 107—107 and 109—109 formed integral with the base of the tiltable head. The latches are normally urged inwardly toward the center of the cooling platen by compression springs 110—110 which are seated between shoulders 111—111 formed in apertures 113—113 in the tiltable head and shoulders 114—114 on longitudinally reciprocable levers 115—115 pivoted to the upper end of levers 117—117 secured to the shafts 106—106. The movement of the latches toward the center of the platen beyond a predetermined position is prevented by the engagement of the platen by projecting portions 118—118 formed on the latches.

The longitudinally reciprocable levers 115—115 have cam rollers 119—119 mounted on the end thereof opposite the end at which the latches are pivoted, which cam rollers cooperate with cams 121—121 fixed by pins 122—122 to a shaft 123 journalled in the tiltable head at 125 and 126. Thus the rotation of the shaft 123 by moving a manually controlled lever 127 to the left (Fig. 1), which is fixed to the shaft 123, will cause the levers 115—115 to be drawn inwardly against the action of the springs and will release the latches 105—105. The accidental release of the latches independent of the manual lever, at all times except when the cams are operatively engaging the cam rollers, is prevented by metal disks 129—129 mounted on the rear of the cams and fitting into slots 130—130 cut in the levers 115—115.

The release of the latches, when the head 63 is tilted, is prevented by a bushing 131 mounted on and slidable longitudinally of the shaft 123. This bushing has a key 133 formed thereon which slides in a key way 134 cut in the head 63 and is urged to the right (Fig. 3) by a heavy compression spring 135 positioned between it and a shoulder 137 in the head 63, into engagement with a plate 138 attached to the stationary head 57. A V-shaped slot 139 is cut in the slidable bushing in which a pin 141 fixed to the shaft 123 rides.

When the tiltable head is in the position shown in Fig. 3, the shaft 123 is free to rotate through approximately 90°, but when the head is tilted out of parallelism with the head 35 the base of the lower right hand edge of the head 63 (Fig. 3) will be moved away from the head 35 and the spring will be permitted to move the bushing to the right moving the apex of the V-shaped slot into engagement with the pin 141 and thereby preventing the rotation of the shaft 123. In order that the entire weight of the upper molding member will not rest on the right hand (Fig. 3) latches when the tiltable head is tilted, and in order to accurately align the upper molding member with the lower molding member, guides 142—142 are fixed to the under surface of the head 63 and engage slots 143—143 cut in the upper molding member and support the upper molding member when the head is tilted.

A guide way 145 mounted transversely of the front of the press 10 and mounted on the supporting plate 15 by upright members 146 and 147 carries a plurality of rollers 149 upon which an ejector plate 150 is slidably mounted. The ejector plate may be moved transversely of the machine on the rollers to carry ejecting pins 151—151 mounted thereon into and out of operative association with the lower molding member.

When it is desired to utilize the ejector plate 150 for removing completed articles from the lower molding member, the ejector plate may be slid to the right (Fig. 1) until it strikes the end of the framework 145, provided the sub-press head is in its lowest position. The ejector plate which also carries mold displacing pins 148—148 will then pass between the upper and lower surfaces of a plurality of retaining members 153—153 attached to the sub-press head and be raised by the operation of the sub-press head until the mold displacing pins 148—148 engage positioning members 152—152 which are secured to the upper molding member and engage apertures 156—156 in the lower molding member. Continued upward movement of the sub-press head will raise the upper molding member out of engagement with the lower molding member and into engagement with the latches 105—105 of the tilting head and the ejecting pins 151—151 will pass through apertures 154—154 in the lower molding member (see Fig. 5) and engage the under surface of the forming members 101—101 to eject the molded articles from the recesses 99—99, thus simultaneously securing the upper molding member for displacement away from the lower molding member and ejecting the molded articles.

Mechanism is provided for holding the lower molding member down while the upper molding member is being moved upwardly by the mold displacing pins cooperating with the positioning members. The mechanism comprises a pair of stopping blocks 155—155 mounted at each side of the tiltable head and secured to shafts 157—157 rotatably journalled in bearings 158—158 which shafts have levers 159—159 attached thereto. The stopping blocks may be moved into association with the lower molding member by moving the lever 127 to the right since the levers 159—159 have links 161 and 162 connecting them to the opposite ends of a lever 163 mounted on the shaft 123.

The lever 127 is normally retained in an upright position to hold the stopping blocks away from the platen and to hold the latches against the platen by a counterweight 165 mounted on the shaft 123 and a spring 166 attached to a sleeve 167 mounted on the shaft 123 and attached to the top of the head 63.

The operation of the main press cylinder, the sub-press cylinder, and the head tilting cylinder is controlled by a number of manually operable valve controls mounted on a valve block 170 which is supported to the main press head 57 by a framework 169 which extends out from the left side thereof (Fig. 1). Manually operable levers 171 and 173 control the sub-press, levers 174 and 175 control the main press and levers 177 and 178 control the head tilting cylinder.

It is believed that a better understanding of this invention will be had by reference to the following description of the operation thereof. In the description of the operation it has been assumed that the table 90 has positioned thereon in apertures 91 and 93, the upper and lower molding members. The levers 171 and 173 may be operated to permit a flow of water through the pipe 43 to the sub-press cylinder 42, thus actuating the piston 41 upwardly and raising the molding members until the upper molding member is clamped by the latches 105—105 against the platen 67. The levers may then be moved to stop the flow of water to the cylinder 42 and to permit the water in the cylinder 42 to escape and allow the pressure in the cylinders 45—45, which is constant, to force the pistons 47—47 downwardly and carry the head 35 downwardly therewith. The head will deposit the lower molding member on the table where its apertures may be filled wth a plastic composition in granulated form.

In order to facilitate the loading of the mold cavities formed by the recesses 95—95 and the forming members 101—101 in the lower molding member, the head carrying the upper molding member may be tilted out of parallelism with the lower molding member in the following manner: The levers 177—178 may be moved to permit fluid under pressure to enter the cylinder 82 through the pipe 83. This will move the piston 81 to the left (Fig. 2) carrying with it the rack 79 and causing the segmental gear associated therewith to rotate in a clockwise direction. This will in turn cause the toggle connection to fold back upon itself and tilt the tiltable head about its pivot point.

After the recesses in the lower molding members have been filled with the plastic composition, the tilting head may be tilted back into parallelism with the lower molding member by manipulating the levers 177 and 178. This will permit the water in cylinder 82 to be forced out through the pipe 83 due to the constant pressure exerted in the chamber 85 formed in the rack 79.

In order to position the upper and lower molding members with the plastic composition between them on the table, the lower mold member may be raised by the head as described hereinbefore, until it comes into contact with the upper molding member, whereupon the lever 127 may be moved to the left and through the cams which it controls and the levers 115—115 which the cams actuate, it will release the latches 105 and the head may then be lowered to its lowest position whereby in passing the table the upper and lower molding members will be deposited thereon.

The table may now be rotated manually about its pivot through one-half a revolution. The molding members with the composition therebetween may be heated between the platens 21 and 61 by elevating the head until the platen 21 carried thereby raises the molding members into engagement with the platen 61. The upward movement of the head 18 is caused by admitting water to the cylinder 26 through the pipe 22 controlled by the levers 177 and 178. The operation as described in connection with loading the mold which is now under pressure, may be repeated with a similar mold now at the sub-pressing station, while heat and pressure are being applied to the molding members at the main pressing station to mold the article.

The molding members at the main pressing station having been under pressure for a predetermined time and the molding members at the sub-pressing station having been loaded, molding members at the main pressing station may be lowered onto the table 90 by lowering the head 17. This is accomplished by manipulating the levers 177 and 178 to allow the water in the cylinder 26 to be forced out through the pipe 27 by the pressure constantly exerted in the cylinder 33.

The table may now be rotated to bring the freshly loaded mold into the main pressing station, and the molding members containing the molded articles may be cooled while under pressure in the following manner at the sub-pressing station. The head 35 may be elevated in the manner described hereinbefore until the molding members are compressed between the cooling platens. After the articles have been cooled sufficiently the molding members may be again lowered to the table and the head 35 may be lowered to its lowermost position, whereupon the ejector plate 150 may be slid between the upper and lower surfaces of the retaining members fixed to the head 35. The lever 127 may then be moved to bring the stopping blocks 155 into a vertical position, whereupon the head carrying the ejector plate may be raised until the pins 151—151 enter the apertures 154 in the lower molding member and engage the forming member 101, forcing it up until the molded articles are forced out of recesses 99. The tiltable head may then be tilted as described hereinbefore and while in that position the molded articles may be removed from the lower molding member. After the molded articles have been removed from the mold the ejector plate may be returned to the left end of the guideway, the molds refilled and the operation repeated.

What is claimed is:

1. In a plastic molding press for two part molds, a tiltable head, spring actuated means for securing a mold part thereto, control means for releasing the spring actuated means, and means for preventing the operation of the control means unless the tiltable head is in a predetermined position.

2. In a plastic molding press for two part molds, a tiltable head, spring actuated means for securing a mold member thereto for angular displacement, manually operable means for releasing the spring actuated means, and means for preventing the operation of the manually controlled means unless the tiltable head is in a predetermined position.

3. In a plastic molding press, a mold including a plurality of sections, a tiltable head, latches mounted thereon for securing a mold section thereto, resilient means for urging the latches to grasp the mold section, means for releasing the latches comprising cam rollers secured to the latches, cams associated with said cam rollers, and a manually rotatable shaft for actuating the cams.

4. In a plastic molding press, a mold including a plurality of sections, a tiltable head, latches mounted thereon for securing a mold section thereto, resilient means for urging the latches to grasp the mold section, means for releasing the latches comprising cam rollers secured to the latches, cams associated with said cam rollers, a manually rotatable shaft for actuating the cams, and a disk mounted on the rear of the cams to prevent the release of the latches independent of the cams.

5. In a plastic molding press for two part molds, a movable head, means for securing a mold part thereto, means for preventing the release of the mold securing means when the head is in a predetermined position comprising a slidable member associated with the mold securing means, resilient means operative upon the movement of the head in one direction for moving the slidable member securing means, and means responsive to the movement of the head in the opposite direction for moving the slidable member against the action of the resilient means to permit the release of the mold securing means.

6. In a plastic molding press for two part molds, a movable head, latches mounted thereon for securing a mold part thereto, a manually rotatable shaft for releasing the latches, means for preventing the rotation of the shaft to release the latches when the head is in a predetermined position comprising a sleeve slidable longitudinally of the rotatable shaft and slidably keyed in the movable head, said sleeve having a triangular slot therein, a pin secured to the rotatable shaft and positioned in the triangular slot, and means responsive to movement of the movable head for moving the sleeve longitudinally of the shaft to determine the amount the shaft may be rotated.

7. In a plastic molding press for two-part molds, a tiltable head, means for securing a mold part thereto, control means for releasing the securing means, means for preventing the operation of the control means when the tiltable head is in a predetermined position, and guide means cooperating between the head and the mold part for preventing displacement of the part when the head is in the predetermined position.

8. In a plastic molding press for two-part molds, a tiltable head, means for securing a mold part thereto, control means for releasing the securing means, means for preventing the operation of the control means when the head is in a predetermined position, and guide means cooperating between the head and the mold part for preventing displacement between the mold part and the second mold part when the head is in the predetermined position.

9. In a plastic molding press for detachable two part molds, means for ejecting molded articles from the molds means for simultaneously therewith securing the upper mold part to the press for subsequent movement out of association with the lower mold part, and guide means integral with the press and distinct from the securing means for preventing the displacement of the upper mold part when out of association with the lower part.

10. In a plastic molding press, a detachable mold including a plurality of sections, means for securing one section of the mold to the press for movement out of association with another section of the mold, and locking means including a slidable sleeve having a substantially triangular aperture cooperating with a pin for preventing the displacement of the first mentioned mold section when out of association with the second mentioned mold section.

11. In a plastic molding press for detachable two part molds, means for ejecting molded articles from the molds, means for simultaneously therewith securing the upper mold part to the press for subsequent movement out of association with the lower mold part, means comprising a rock shaft for disengaging the upper mold part from the press, and locking means associated with the shaft for preventing the displacement of the upper mold part when out of association with the lower part.

In witness whereof we hereunto subscribe our names this 30th day of November, A. D. 1928.

JEREMIAH AMOS DE TURK.
ESTYLE DRUCY HANSON.